UNITED STATES PATENT OFFICE.

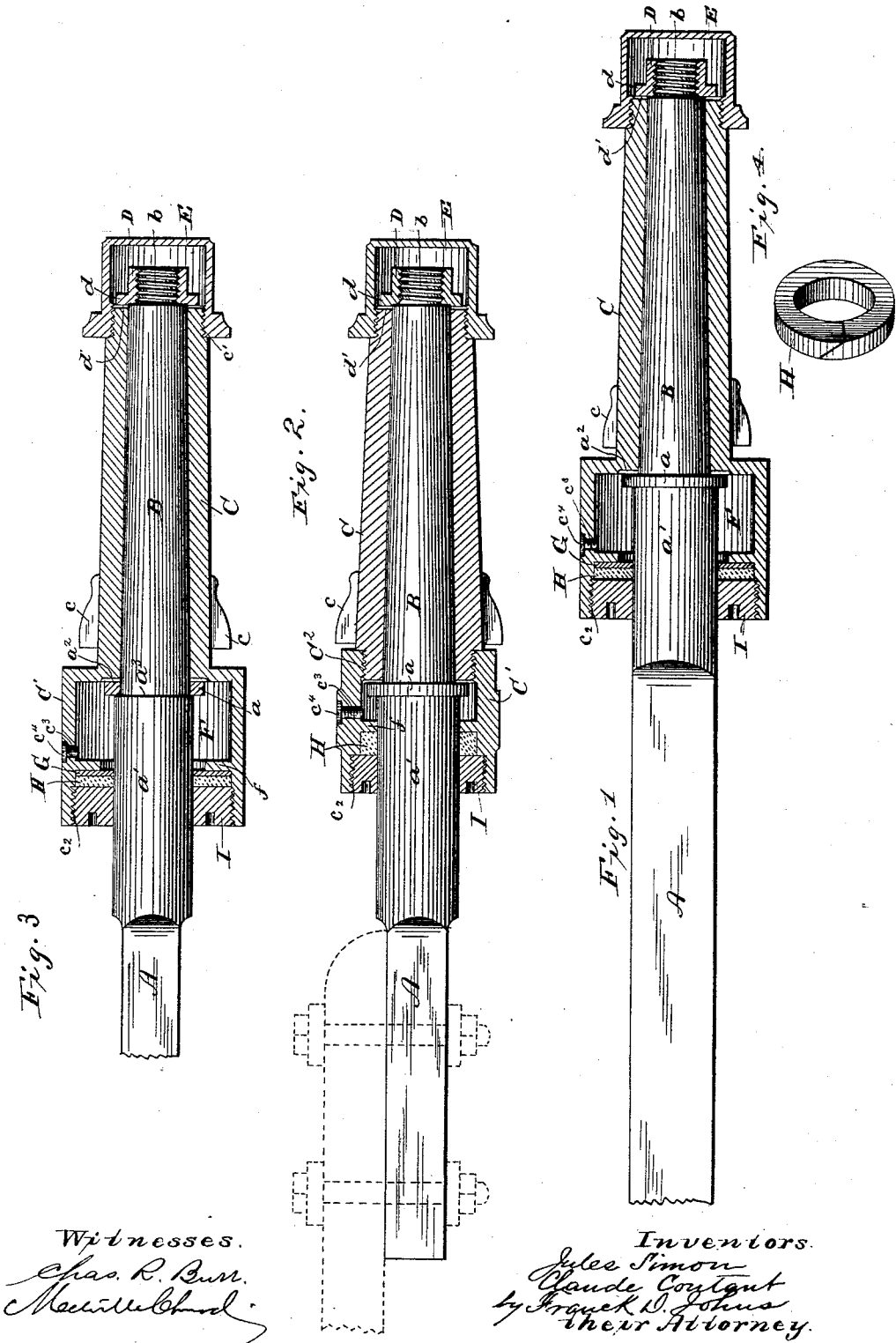

JULES SIMON AND CLAUDE CONTANT, OF FORT WAYNE, INDIANA.

AXLE-LUBRICATOR.

SPECIFICATION forming part of Letters Patent No. 348,787, dated September 7, 1886.

Application filed April 19, 1886. Serial No. 199,411. (No model.)

*To all whom it may concern:*

Be it known that we, JULES SIMON and CLAUDE CONTANT, citizens of the United States, residing at Fort Wayne, in the county of Allen and State of Indiana, have invented certain new and useful Improvements in Self-Lubricating Vehicle-Axles; and we do hereby declare the following to be a full, clear, and exact description of the invention, such as will enable others skilled in the art to which it appertains to make and use the same.

Our invention relates to improvements in self-lubricating vehicle-axles; and it consists in certain novelty of construction and arrangement of parts, all of which we will now proceed to point out and describe, reference being had to the accompanying drawings, in which—

Figure 1 is a central longitudinal section of an axle-box embodying our invention, the axle and spindle being shown in elevation. Fig. 2 is a modification of our invention, the axle-box being shown in section and the axle and spindle in elevation. Fig. 3 is a still further modification of our said invention, the axle-box being shown in section and the axle and spindle in elevation; and Fig. 4 is a detail.

Referring to said drawings, A represents one end or section of a vehicle-axle provided with a spindle, B, having a screw-threaded outer end, $b$.

$a$ is an annular collar on the axle at the inner end of the spindle. The main axle is formed by welding to the section A a similarly-formed section provided with a spindle and collar, as above described. If desired, the main axle may be formed in one piece, and the section A can be used as a short stub-axle secured to the main axle, as shown in Fig. 2.

C is a tapered axle-box provided with feathers $c$.

D is a nut having a flange, $d$. This nut is screwed on the threaded end $b$ of the spindle and holds the axle-box in place. The outer end of the axle-box is provided with an external left-hand screw-thread, $c'$.

E is an end cap-piece, which is screwed onto the end of the box. This cap serves as an oil-cup and also protects the spindle from sand, dust, &c. When it is adjusted, it is filled with oil, which is fed to the spindle through the grooves $d'$ on the inner side of the nut $d$. The inner end, C', of the axle-box is enlarged and projects back over the axle, forming an oil-reservoir, F.

$f$ is an inner annular flange in the inner end, C', of the axle-box having a central opening large enough to permit the flange to pass over the collar $a$. The axle just back of the collar $a$, at $a'$, is rounded, and the packing and retaining nut hereinafter described form a close joint with the same.

$c^2$ is an internal screw-thread on the inner end of the portion C' of the axle-box.

G is a metal ring which is slipped over the inner end of the section A of the axle and bears against the flange $f$.

H is a packing of rubber or other suitable material, which fits against and forms a tight joint with the rounded portion $a'$ of the axle.

I is a nut which is screwed into the rear end of the portion C' of the axle-box and holds the packing in place. The reservoir is filled with oil through the hole $c^3$, which is closed by the screw-plug $c^4$. The oil is fed to the spindle through the grooves $a^2$ on the inner end of the axle-box. The extended portion C' of the axle-box also forms a protection from dust, sand, &c. The ring G, packing H, and nut I are slipped over the inner ends of the sections of the axle before the parts are welded together, or when using the sections as stub-axles, the ring, packing, and nut are slipped on section before they are secured to the main axle. This form of our improved axle we use with ordinary vehicles. For fine carriages we make a slight difference in the construction of the axle-box and oil-reservoir, as shown in Fig. 2. In this latter construction we make an external screw-thread, $C^2$. The portion C', forming the oil-reservoir, is made of brass or other material, and is screwed onto the inner end of the axle-box. In this construction the flange $f$ is made large enough to bear against the rounded portion $a'$ of the axle, and the ring G is dispensed with. The packing-ring we cut, as shown in Fig. 4, so that it may be put in place, after the sections of the axle have been welded together, and so that it may be replaced at any time.

In Fig. 3 we show a still further modification of our invention. In this form of our invention the axle may be made in one solid piece, provided at its outer ends with shoulders $a^3$, and the collar $a$ is made removable. With this construction the packing and nut can be first slipped on from the outer ends of the axle and then adjust the collar $a$ and axle-box, which is secured in place, as heretofore described.

Having thus fully described our invention, what we claim as new, and desire to secure by Letters Patent, is—

1. The axle A, provided with the spindle B and annular collar $a$, in combination with the axle-box C, having the oil-grooves $a^2$ and the extended portion C′, forming an oil-reservoir and provided with the flange $f$, and the washer H, and nut I, all arranged and operating substantially as shown and described.

2. The combination of the axle A, having the rounded portion $a'$, collar $a$, and spindle B, having the screw-threaded outer end, $b$, the axle-box C, having the oil-grooves $a^2$, the extended portion C′, forming an oil-reservoir and provided with the annular flange $f$, washer H, and nut I, and the nut D, having the flange $d$ and oil-grooves $d'$, and cap-piece E, all arranged and operating substantially as shown and described.

In testimony whereof we affix our signatures in presence of two witnesses.

JULES SIMON.
CLAUDE CONTANT.

Witnesses:
JOSEPH LANGORD,
JULES P. MOREAU.